United States Patent [19]

Iokibe et al.

[11] Patent Number: 5,422,984
[45] Date of Patent: Jun. 6, 1995

[54] APPARATUS AND METHOD FOR AUTOMATICALLY GENERATING MEMBERSHIP FUNCTION AND/OR FUZZY INFERENCE RULE FOR FUZZY INFERENCE SYSTEM

[75] Inventors: Tadashi Iokibe; Takashi Kimura, both of Tokyo, Japan

[73] Assignee: Kabushiki Kaisha Meidensha, Tokyo, Japan

[21] Appl. No.: 899,743

[22] Filed: Jun. 17, 1992

[30] Foreign Application Priority Data

Jun. 18, 1991 [JP]  Japan .................................. 3-145712
May 8, 1992 [JP]  Japan .................................. 4-115585

[51] Int. Cl.⁶ ........................ G06F 9/44; G05B 13/00; G05B 13/02
[52] U.S. Cl. ........................................ 395/51; 395/61; 395/75; 395/900; 395/22
[58] Field of Search ..................... 395/51, 61, 900, 75, 395/77, 906, 22, 3, 76

[56] References Cited

U.S. PATENT DOCUMENTS

| | | | |
|---|---|---|---|
| 4,193,115 | 3/1980 | Albus | 364/300 |
| 5,025,499 | 6/1991 | Inoue et al. | 364/165 |
| 5,189,728 | 2/1993 | Yamakawa et al. | 395/51 |
| 5,267,348 | 11/1993 | Someya et al. | 395/61 |
| 5,295,061 | 3/1994 | Katayama et al. | 364/157 |

OTHER PUBLICATIONS

Sun et al., "Fuzzy Modeling Based on Generalized Neural Networks and Fuzzy Clustering Objective Functions," Proc. 30th Conf. on Decision and Control, Dec. 1991, 2924-2929.

Kang et al., "Adaptive Fuzzy Logic Control," IEEE Intl. Conf. on Fuzzy Systems, Mar. 1992, 407-414.

Jou, C. C., "A Fuzzy Cerebellar Model Articulation Controller," IEEE Intl. Conf. on Fuzzy Systems, Mar. 1992, 1171-1178.

Ozawa et al., "Formulation of CMAC-fuzzy system," IEEE Intl. Conf. on Fuzzy Systems, Mar. 1992, 1179-1186.

*Primary Examiner*—Robert W. Downs
*Attorney, Agent, or Firm*—Bachman & LaPointe

[57] ABSTRACT

An apparatus and method for automatically generating fuzzy rules and/or membership functions for a fuzzy inference system are disclosed in which an input system, constituted by a computer system, is provided having a learning memory for storing learning data for all of input spaces, the input spaces being clustered for each fuzzy inference input variable and an output system, constituted by the computer system, is provided for determining a fuzzy label for each input variable, for dividing support sets of the respective input variables according to the determined fuzzy labels, for determining and storing a weight table of the computer system according to the number of divided support sets, for learning the computer system using the learning data on a basis of the fuzzy labels of the respective input variables, the weight table, and the number of divided support sets so that each representative point of the fuzzy labels of the input variables is input to the learned computer system to automatically derive at least one output value corresponding to the representative points for the input variables, and for providing the fuzzy labels for the output variable to fuzzify the output value to form the membership function of the output system.

6 Claims, 9 Drawing Sheets

SUPPORT SET OF X

SUPPORT SET OF Y

|   | Y | | | | |
|---|---|---|---|---|---|
|   | Y₁ | Y₂ | Y₃ | Y₄ | Y₅ |
| X₁ | | | | | |
| X₂ | | | | | |
| X₃ | | | | | |
| X₄ | | | | | |
| X₅ | | | | | |

INPUT SPACE OF X

INPUT SPACE OF Y

APPARATUS AND METHOD FOR AUTOMATICALLY GENERATING MEMBERSHIP FUNCTION AND/OR FUZZY INFERENCE RULE FOR FUZZY INFERENCE SYSTEM

BACKGROUND OF THE INVENTION

1. Field of The Invention

The present invention relates to an apparatus and method for automatically generating membership functions of input variable(s) and output variable and/or their applied fuzzy rules for a fuzzy inference system.

2. Description of The Background Art

A previously proposed fuzzy inference system is exemplified by a U.S. patent application Ser. No. 07/581,770 filed on Sep. 13, 1990 having a priority based on a Japanese Patent Application No. Heisei 1-239514 which corresponds to an R. O. C. (Taiwan) Patent Application No. 79107756 filed on Sep. 14, 1990 (which is now patented as Patent No. 47856 issued an Oct. 1, 1991), and which corresponds to a Korean Patent Application No. 90-14455 filed on Sep. 13, 1991.

As appreciated from the disclosed fuzzy inference system described above, it is most important to carry out full tuning operations including collections of data on know-hows of well skilled experts and their simulations when an architecture of a control system is designed.

FIG. 1 shows a procedure of designing the architecture of the expert fuzzy control system.

In FIG. 1, a step S1 is a step for understanding a system to be subjected to the system architecture for a designer.

That is to say, in the step S1, the expert investigates and specifically understands the system what can be measured or cannot be measured, what kind of operations the expert should made, what is an object of providing the system, and what is a problem to be solved by the system.

In a step S2, the data on know-hows of a well skilled operator are collected. That is to say, in the step S2, when the well skilled expert drives the system to be controlled, data of the know-hows such as in which states what the system notices, what objects lies in the system, what kind of operation the system is required, how the system is operated, and so on.

In such a collecting operation as described above, it should be paid to attention that states of process are roughly classified into three or five levels (high, intermediate, and low), their operations are rather finely classified into five or seven levels (considerably small, small, intermediate, rather large, considerably large), and, then, the know-hows are obtained through interviews and/or enquire (=poll) to the well skilled operators. how many levels the classification can be easily be made are, generally, five levels. This classification is called a fuzzy clustering. Then, these know-hows are evolved into linguistic rules of IF~THEN forms.

Next, the membership functions are extracted.

Generally, various types of membership functions are used such as triangle type, bell shaped type, some function type, and trapezoid type. The best expressible type from among these types of the membership function is said to be an exponential function type. (However, actually used type is the triangular type.) Then, in this case, only a vertex of the triangular membership function expressing each fuzzy level may be collected from the well skilled operators. One of the reasons is that what is expressed in the linguistic fuzzy rule is a characterized point and the fuzzy inference is carried out through an inner interpolation and the other reason is that a clear answer cannot be obtained for a question, e.g., of which value corresponds to about 0.8 or rather intermediate.

A step S3 is a step for collecting operation data. This step S3, that is to say, is to collect values of ruled variables in the step S2 using a data recorder (for example, a temperature, pressure, or flow quantity as an input variable and an opening angle of a valve as an output variable). Then, a matching is taken on the basis of the data with the operating know-hows derived in the step S2.

In a step S4, the know-hows are applied to a fuzzy controller of the fuzzy interference system. That is to say, the step S4 teaches definitions of variables carried out when the operating know-hows of the well skilled expert determined in the step S3 are applied to the control system. The definitions of the variables are such that attributes of the variables handled in IF~-THEN~linguistic rules. Thereafter, fuzzy levels and membership functions of the respective variables are input to the fuzzy controller and the fuzzy control linguistic rules are registered.

In a step S5, the simulation is carried out. In details, the step S5 is a step for simulating using the control rules and membership functions input in the step S4. Then, the data collected in the step S3 are used as evaluation functions and a fuzzy modeling of the system to be controlled is carried out.

The control for the modeling is carried out and simulated. In addition, the recorder is used to collect and analyze operations of the well skilled expert and controlled variables and their directions derived from the fuzzy controller.

In a step S6, an actual operation of the fuzzy inference system is carried out. After a preparation of the series of steps S1 through S5 is carried out, the actual operation thereof is carried out. In the step S6, minute tunings of the membership functions are repeated to achieve an optimization of the fuzzy interference system.

The step S2 for collecting the data on the know-hows from the well skilled operators is an important factor to determine whether the fuzzy control system becomes put into practice from among the steps S1 through S6 of FIG. 1.

Although the rules and membership functions can to some degree be determined according to the step S2, the step S2 is not always appropriate for determining them. The reason is that problems of how well the know-hows of the well skilled experts can be fuzzy clustered and to what degree the know-hows can be expressed as the fuzzy rules are not clearly defined.

In addition, since the fuzzy labels representing the membership functions are uniformly generated, such fuzzy expressions as"large"and/or"rather large"cannot be made.

SUMMARY OF THE INVENTION

It is, therefore, an object of the present invention to provide an improved apparatus and method for automatically generating appropriate fuzzy rules and/or membership functions which automatically generate appropriate fuzzy rules and fuzzy labels representing the membership functions with no uniform expression of the fuzzy labels.

The above-described object can be achieved by providing an apparatus for automatically generating fuzzy rules and membership functions to be supplied to a fuzzy inference system, comprising: a) a process data collecting block for collecting first data from a process which is a controlled object of the fuzzy inference system and for storing the first data into its process data temporary area; b) a data processing block for calculating a second data which is directly measured from the process on the basis of the process first data stored in the temporary area of the process data collecting block and for storing the calculated second data into its processed data temporary area; c) a process data base generating block for generating a process data base from both first and second data stored in the respective temporary areas of process data collecting block and data processing block: d) a fuzzy clustered data base generating block for receiving third data generated in the process data base generating block and a fuzzy evaluation function and for detecting a status space satisfying the fuzzy evaluation function from the process data base so as to generate a fuzzy clustered data base; e) a fuzzy rule generator for adding a fuzzy label to a data of each of input and output variables stored in the fuzzy clustered data base generated in the fuzzy clustered data base generating block, for generating fuzzy inference rules in the format of IF~THEN~, and for storing the generated fuzzy inference rules into a fuzzy inference rule file; and, f) a membership function generator for generating membership functions corresponding to the fuzzy labels of the respective variables using the data base generated by the fuzzy clustered data base generating block and for storing the generated membership functions into a membership function file.

The above-described object can also be achieved by providing an apparatus for automatically generating a membership function for a fuzzy inference system, comprising: a) an input system, constituted by a computer system, having a learning memory for storing learning data for all of input spaces, the input spaces being clustered for each fuzzy inference input variable; b) an output system, constituted by the computer system, for determining a fuzzy label for each input variable, for dividing support sets of the respective input variables according to the determined fuzzy labels, for determining and storing a weight table of the computer system according to the number of divided support sets, for learning the computer system using the learning data on a basis of the fuzzy labels of the respective input variables, the weight table, and the number of divided support sets so that each representative point of the fuzzy labels of the input variables is input to the learned computer system to automatically derive at least one output value corresponding to the representative points for the input variables, and for providing the fuzzy labels for the output variable to fuzzify the output value to form the membership function of the output system.

The above-described object can also be achieved by providing a method for automatically generating a membership function for a fuzzy inference system comprising the steps of: a) storing learning data for all of input spaces, the input spaces being clustered for each fuzzy inference input variable; b) determining a fuzzy label for each input variable; c) dividing support sets of the respective input variables according to the determined fuzzy labels; d)determining and storing a weight table of the computer system according to the number of divided support sets; e) for learning the computer system using the learning data on a basis of the fuzzy labels of the respective input variables, the weight table, and the number of divided support sets so that each representative point of the fuzzy labels of the input variables is input to the learned computer system to automatically derive at least one output value corresponding to the representative points for the input variables; and f) providing the fuzzy labels for the output variable to fuzzify the output value to form the membership function of the output system.

BRIEF DESCRIPTION OF THE DRAWINGS

The present invention will be understood more fully from the detailed description given hereinbelow and from the accompanying drawings of the preferred embodiments of the invention. However, the drawings are not intended to imply limitation of the invention to a specific embodiment, but are for explanation and understanding only.

In the drawings:

FIG. 9 (C) is an explanatory view of a Cerebellar Model Arithmetic Computer used in the second preferred embodiment according to the present invention.

DESCRIPTION OF THE PREFERRED EMBODIMENTS

Reference will hereinafter be made to the drawings in order to facilitate a better understanding of the present invention.

First Preferred Embodiment

First, a fuzzy clustering function will be described below.

The fuzzy clustering function is provided with a general-purpose capability to determine fuzzy rules and membership functions which are most important for the architecture of the expert fuzzy control system.

Essential elements to design the architecture of an appropriate fuzzy control system include an automatic generation of appropriate control fuzzy rules and membership functions from dynamic characteristics including operations of a process to be controlled by a well skilled operator, an execution of an evaluation for a result of control on a real time base during a drive condition, and checking of the prepared membership functions.

Figure 2:
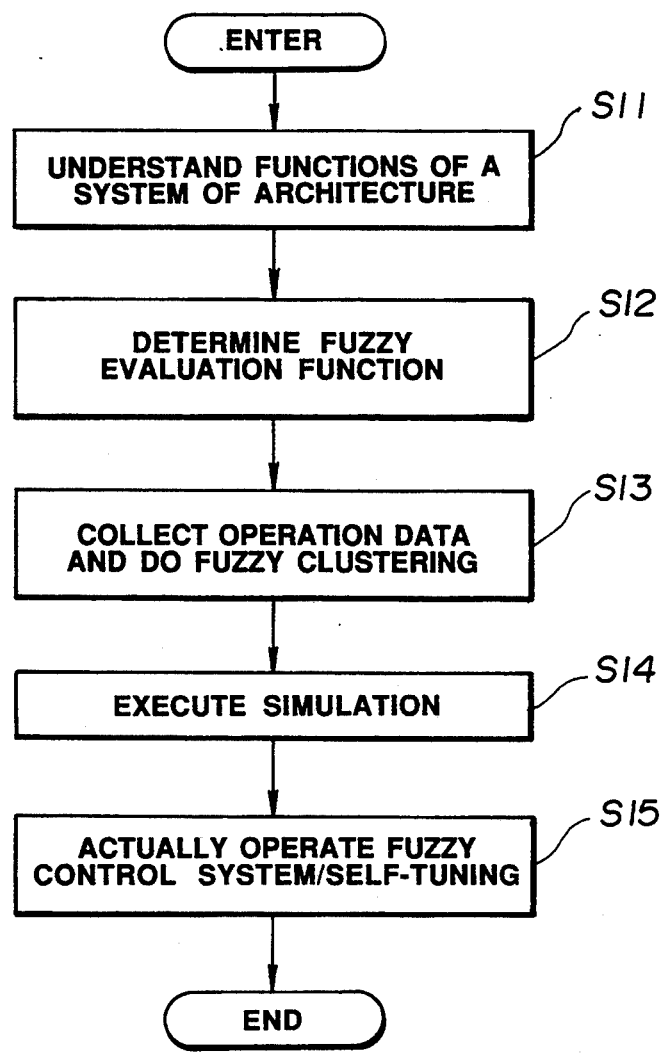
FIG. 2 is a general procedure of designing the architecture of an expert fuzzy control system carried out in a first preferred embodiment according to the present invention.

FIG. 2 shows a general procedure of building up the expert fuzzy control system.

In a step S11, the designer investigates and understands controlled object about what can be measured from the controlled object and about what is a measurement result so as to grasp an optimum operating situation of the controlled object.

In a step S12, a fuzzy evaluation function is determined, i.e., the fuzzy evaluation function to carry out the fuzzy clustering.

In a step S13, the designer collects the data on the operations on the controlled object and carry out the fuzzy clustering.

That is to say, when the operation data are collected and data representing the optimum operating situation are picked up to carry out the fuzzy clustering. Thereafter, the control rules and the membership functions are automatically generated.

Figure 1:
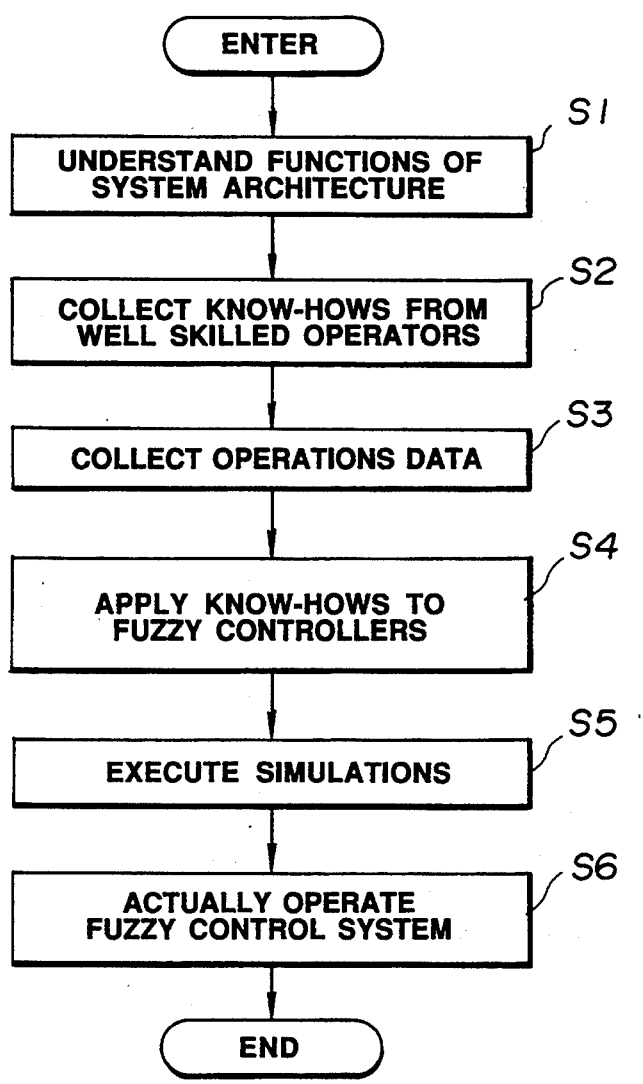
FIG. 1 is a general procedure of designing an architecture of an expert fuzzy control system described in the BACKGROUND OF THE INVENTION.

It is noted that, as different from those steps in FIG. 1, it is not necessary to roughly divide the number of fuzzy labels in the step S13 and the numbers of the fuzzy rules and membership functions are made equal to the number of the fuzzy clusterings as the optimum operating state. In other words, it is not necessary to provide meaning such as large or intermediate for the fuzzy labels. In addition, the shape of the membership function may be based on the triangle.

In a step S14, a simulation is executed.

That is to say, the simulation is executed using the automatically generated rules and membership functions.

In the step S14, a recorder is operated to input the data under the operating condition of the controlled object which is not appropriate for the control in the fuzzy inference and to compare and evaluate whether the output result is improved. In a step S15, a self-tuning for the actual operation in the fuzzy control system is carried out.

In the step S15, after the preparation up to the step S14, the fuzzy rules and membership functions are actually applied to the actual system.

That is to say, in the step S15, evaluating the result of control by the fuzzy control system automatically, a minute tuning of the membership functions is repeated using a fuzzy adaptive control means or system so as to optimize the fuzzy control system.

Figure 3:
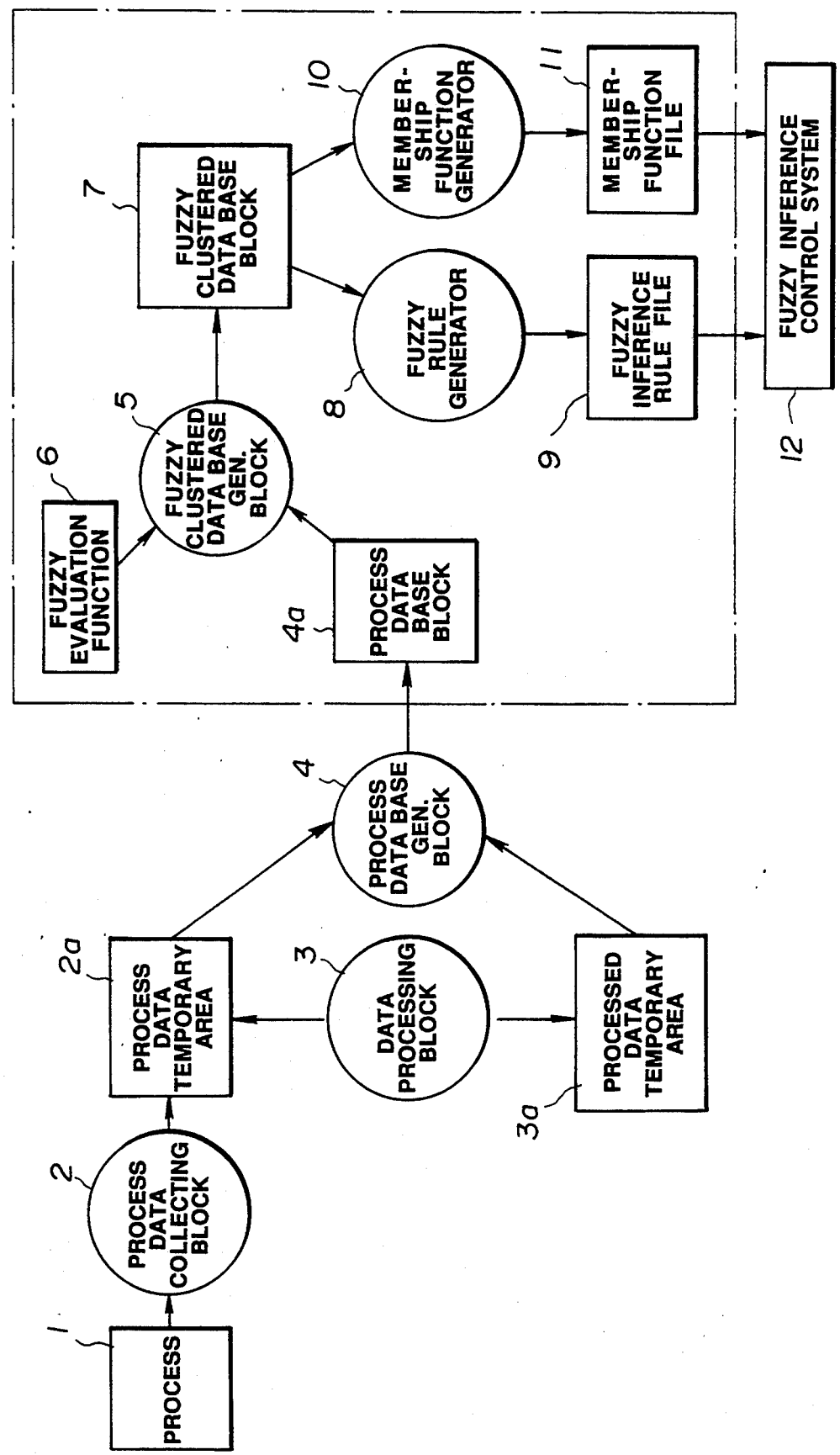
FIG. 3 is a general circuit block diagram of a fuzzy rule and membership function automatically generating apparatus in the first preferred embodiment.

FIG. 3 shows a functional block diagram of the fuzzy rule and/or membership function automatic generating apparatus in the first preferred embodiment.

In FIG. 3, numeral 1 denotes a process to be controlled including the operator's operations. The data from the process 1 are collected by a process data collecting block 2 under a certain condition (for example, a constant interval). The data collected by the data collecting block 2 are stored in a process data temporary area 2a.

The process data stored in the temporary area 2a are supplied to a data processing block 3 which calculates the data not directly measured such as change rate, deviations, and integrated values and are supplied to a processed data temporary area 3a. The data stored in both temporary areas 2a, 3a are generated in a process data base generating block 4 as the data base. The generated data are supplied and stored into a process data base block 4a in a form of a time series data.

Numeral 5 denotes a fuzzy clustered data base generating block in which a process data base is filed using a fuzzy evaluation function of a fuzzy evaluation function block 6, a status space satisfying the fuzzy evaluation function is detected from a process data base block 4a, and a fuzzy clustered data base. The generated data base is stored in the fuzzy clustered data base block 7. The data base of the data base block 7 is provided for a fuzzy rule generator 8. The fuzzy rule generator 8 serves to add fuzzy labels to data on respective variables. In addition, the fuzzy rule generator 8 serves to generate fuzzy inference rules in IF~THEN~formats and supply and store them to a fuzzy inference rule file 9.

The data base in the fuzzy clustered data base block 7 are supplied to a membership function generator 10. The membership function generator 10 serves to generate the membership functions corresponding to the fuzzy labels for the data on the respective variables stored in the data base block 7 and store them into a membership function file 11. The fuzzy inference rules and membership functions stored in both files 9, 11 are used in a fuzzy inference system 12.

Next, a transcription from the evaluation function and process data base to the fuzzy clustered data and the generations of the fuzzy inference rules in the fuzzy inference rule file 9 and the membership function file 11 will be described with reference to FIGS. 9 (A) and 9 (B).

First, the fuzzy clustering data base generation will be described below:

As described above, the process data base block 4a stores data S on a state of process generated by means of the process data base generating block 4 and the data state of process generated by means of the process data base generating block 4 and on operations by the well skilled operator in a matrix form as shown in the following.

$$S = \begin{bmatrix} X1 \\ X2 \\ X3 \\ Xi \\ Xn \end{bmatrix} \quad (1)$$

$$= \begin{bmatrix} D11 & D12 & D13 & \ldots D1i & \ldots D1m \\ D21 & D22 & D23 & \ldots S2i & \ldots D2m \\ D31 & D32 & D33 & \ldots D2i & \ldots D3m \\ Di1 & Di2 & Di3 & \ldots Dii & \ldots Dim \\ Dn1 & Dn2 & Dn3 & \ldots Dni & \ldots Dnm \end{bmatrix}$$

The equation of (1) can be interpreted as a dynamic characteristic matrix of the process 1 in an N-order dimension space of X1 through Xn.

The fuzzy evaluation function in the fuzzy evaluation function can be expressed in the following equations (2) and (3):

$$F(s) = f1(s) V f2(s) V \ldots V fi(s)(f) \ldots V fn(s) \ldots \quad (2)$$

$$fi(s) = \alpha i [1 \Lambda [Xk (Dks)]] \quad (3)$$

wherein k=a or b:

F(s): a general fuzzy evaluation function;
αi: contributivity of fi(s) to F(s);
Xk: a process variable for the fuzzy evaluation in the space i;
Dks: a fuzzy evaluation value in Dk;
V: OR operator; and Λ: AND operator.

The equation (1) indicates that the state of the process is desirable when f1(s), f2(s), ---, or fn(s) is satisfied.

A constant 1 in the right side of the equation (2) is provided for expression purpose.

The equation (2) can be evolved as a fuzzy inference rule expressed as follows:

$$\text{IF Xa is Das and --- and Xb is Dbs THEN C is } \alpha i. \quad (4)$$

In the above format, C denotes a variable representing the status of the process, αi denotes a desirableness and has a segment value from 0 to 1.0. As the value of α1 is increased, the contributivity becomes higher to the desirability.

The fuzzy evaluation functions expressed in the equations (2) and (3) serve to transcribe the process data base to the fuzzy clustered data base. This extracts combinations of the process variables X1 through Xn which satisfy the fuzzy evaluation functions from the dynamic characteristic matrix of the process and the extracted combinations of the process variables are stored in the fuzzy clustered data base block.

Hereinafter, the characterizing points of the fuzzy clustering function will be described below.

Suppose that the fuzzy evaluation functions are expressed as follows:

$$F(s) = fa(s) \quad (5)$$

$$fa(s) = \alpha a[1 \Lambda(Xi(Dis))\Lambda(Xj(Djs))] \quad (6)$$

Figure 4A:
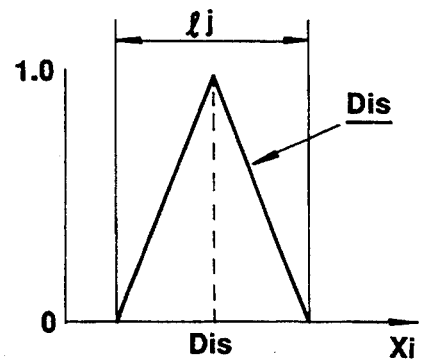
FIGS. 4 (A) and 4 (B) are explanatory views for explaining fuzzy numbers.
Figure 4B:
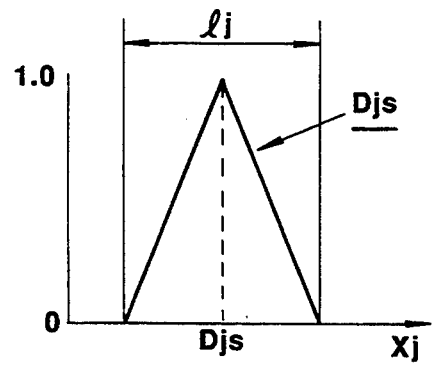
Figure 5:
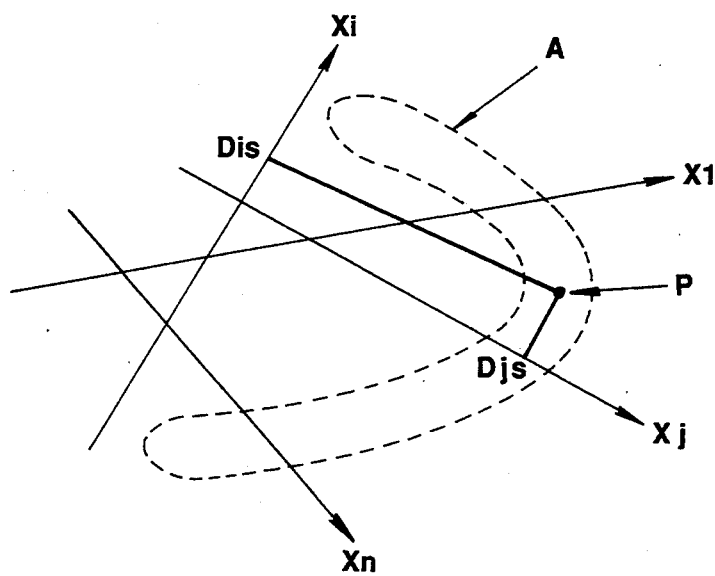
FIG. 5 is an explanatory view of a dynamic characteristic of a process to be controlled.

Suppose, then, that αa=1, Dis and Dis denote fuzzy numbers having the membership functions shown in FIGS. 4 (A) and 4 (B), and N dimensional process dynamic characteristic matrix having the process variables of X1 through Xn to be subjected to the control is as shown by A in FIG. 5.

A point P shown in FIG. 5 is a point which indicates f(a)=1 when Xi=Dis and XJ=Dis in the equation (6) of the fuzzy evaluation function.

Figure 6:
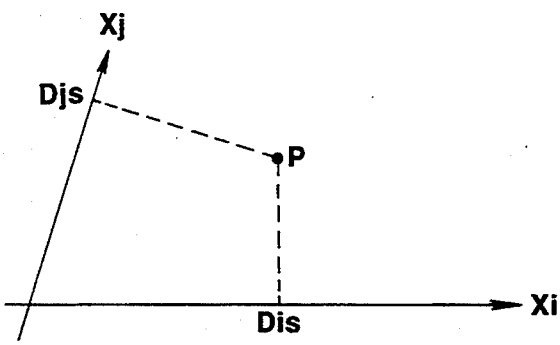
FIG. 6 is an explanatory view for explaining a coordinate system of Xi-Xj.

If Xi, Xj are converted into an orthogonal coordinate system, the point P is shown in FIG. 6.

Figure 7:
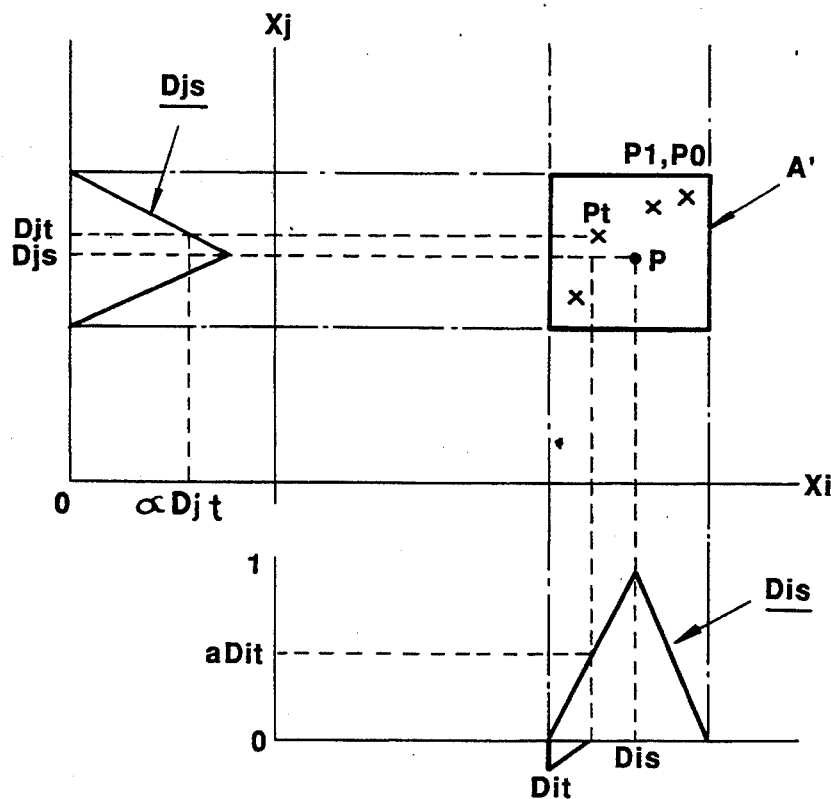
FIG. 7 is an explanatory view for explaining a fuzzy space.

Since the data being sampled by a computer is generally not in a continuous value (analog) form but in a discrete value (digital) form, the sampled data does not always pass the point of P in FIG. 6 and FIG. 7. Therefore, suppose that a point P' which gives a maximum value of fa(s) in the equation (5).

In FIG. 7, A' denotes a fuzzy space satisfying fa(s) in the coordinate system of Xi−Xj.

Supposing that points P0, P1, P2,—within the space A' denote discrete value data sampled from the process and generally a point Pt is represented by (Dit, Djt), Xi and Xj can be expressed as follows:

Xi=α Dit representing a magnitude of Dit belonging to Djs,
Xj=α Djt representing the magnitude of Djt belonging to Djs.

If a satisfaction S'(t) of the point P' is defined in the following equation (7), the point P' to be derived within the mark A' may be a combination of (Dit, Djt) which gives a maximum of a value in the equation (7):

$$S'(t) = \alpha Dit + \alpha Djt \quad (7)$$

Suppose that values of Xi, XJ of the point P' which gives the maximum of S'(t) in the coordinate system Xi−Xj are denoted by Dip, Djp, respectively, values on respective axes except Xi∼XJ may be values on a column of Xi=Dip, Xj=Djp in the equation (1).

That is to say, the combination of the sampled data satisfying Xi=Dip, Xj=Djp can be expressed in the following equation (8).

$$\begin{bmatrix} X1 \\ X2 \\ X3 \\ Xi \\ Xj \\ Xn \end{bmatrix} = \begin{bmatrix} D1p \\ D2p \\ D3p \\ Dip \\ Djp \\ Dnp \end{bmatrix} \quad (8)$$

The data to be transcribed to the fuzzy clustered data base may be the equation (8).

The fuzzy clustered data block 7 stores the data expressed in the equation (8) and which is fuzzy clustered representing the optimum status of the process from the process data base 4a by the number corresponding to the fuzzy evaluation functions expressed in the equations (2) and (3).

Next, the generations of the fuzzy rules and membership functions will be described below.

The fuzzy clustered data base block 7 stores data sets (D1p, D2p, ---, Dip, ---, Dnp) rather satisfying the equations (2) and (3). That is to say, the fuzzy clustered data base block 7 stores an operating variable of the operator and a status quantity of the process in a state where the process to be controlled rather satisfies the fuzzy evaluation functions.

(A) Generation of Fuzzy Rule

Suppose that the process variables (X1 through Xn) are divided into the process data XP and operation data XS.

XP denotes an input variable and XS denotes an output variable.

$$XP = XP1, XP2, ---, XPj, ---, XPn \quad (9)$$

$$XS = XS1, XS2, ---, XSj, ---, XSn \quad (10)$$

Suppose, then, the data sets of the respective variables of XP and XS stored in the fuzzy clustered data base block 7 are denoted by DP and DS, respectively, XP and XS can be expressed as follows:

$$XP = Dp1, Dp2, ---, Dpj, ---, Dpn \quad (11)$$

$$XS = Ds1, Ds2, \ldots, Dsj, \ldots, Dsn \qquad (12)$$

If the fuzzy labels (LDP, LDS) are defined for the values (DP, DS) with respect to the respective variables (XP, XS). LDP and LDS can be established in the following equation.

$$LDP = LDP1, LDP2, \ldots, LDPj, \ldots, LDPn \qquad (13)$$

$$LDS = LDS1, LDS2, \ldots, LDSj, \ldots, LDSn \qquad (14)$$

The fuzzy rules are generated using the equations (9) through (14) by the number corresponding to that of the data sets in the fuzzy clustered data base block 7.

R: IF $XP1$ is $LDP1$
and $XP2$ is $LDP2$
.
.
.
and $XPj$ is $LDPj$
.
.
.
and $XPn$ is $LDPn$
THEN $XS1$ is $LDS1$
and $XS2$ is $LDS2$
.
.
.
and $XSj$ is $LDSj$
.
.
.
and $XSn$ is $LDSn$.

(B) Generation of the Membership Function

A method for generating a membership function of one process function Xi will be described below.

Suppose that the fuzzy label of the variable Xi is LDij (provided that i=1~n), a value of the variable Xi stored in the fuzzy clustered data base block 7 is denoted by Dij (j=1~n), and Dik (k=1~n) denotes a rearranged one of Dij in the increased order.

Figure 8:
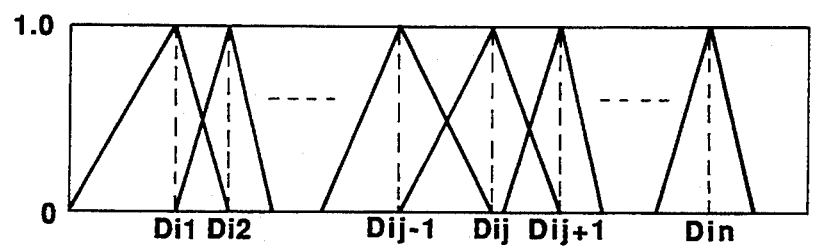
FIG. 8 is an explanatory graph representing a membership function

In this case, the generated membership function is shown in FIG. 8. In addition, since the handled variable is one dimensional, the membership function is generated when a belonging value of a fuzzy set indicates 1.0, its adjacent belonging value indicates 0

Second Preferred Embodiment

For simplification of the explanation, an apparatus for generating membership functions of output variables using a Cerebellar Model Arithmetic Computer system (hereinafter referred to as CMAC).

Figure 9A:
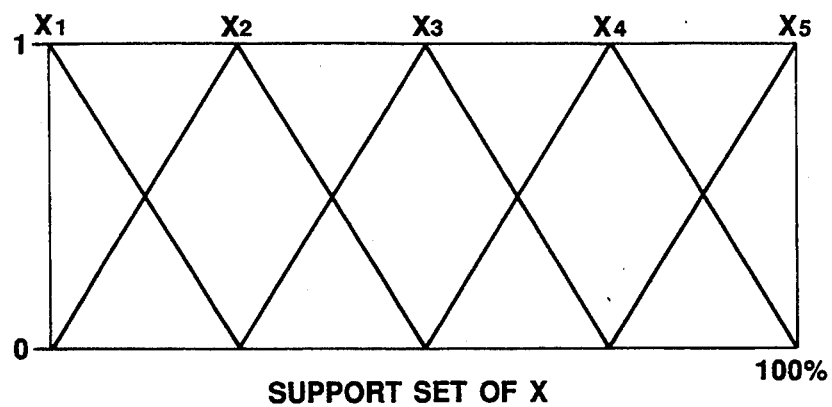
FIGS. 9 (A) and 9 (B) are explanatory views for explaining a relationship between an input space, variable, and fuzzy labels carried out in a second preferred embodiment of a membership function automatically generating system according to the present invention.
Figure 9B:
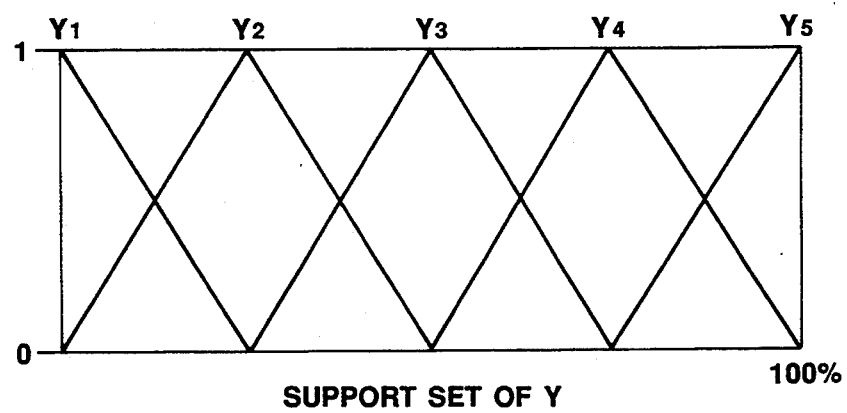
Figure 9C:
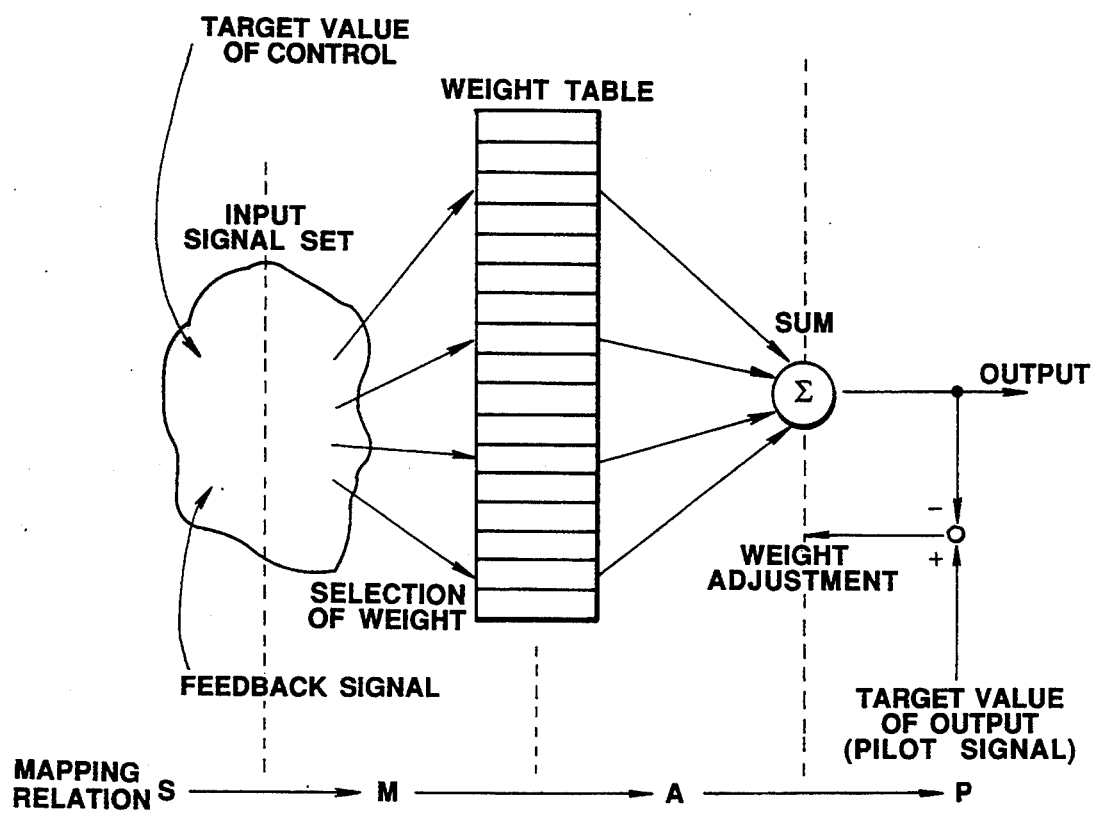

FIG. 9 (C) shows a general concept of the CMAC in which a weight table is attached and in which a learning and adaptive fuzzy control method are used.

For the details of the CMAC refer to a Japanese Text Book of Section 1 (what is CMAC) and Section 2 (Development Specification) published internal company in which the inventors are employed of Japan.

That is to say, the CMAC is an abbreviation for the (Cerbeller Model Arithmetic Computer and is formulated as a mathematical model of information processing mechanism constituted by tremendous amounts of neurons in corticates of cerebellar.

The CMAC is defined by a series of mappings as described below:

$$S \rightarrow M \rightarrow A \rightarrow P \qquad (1),$$

wherein S denotes an input vector, M denotes a set of Hapatopisida (liverwort) fabrics used for the coding, A denotes a set of granular cells to which M is connected, and P denotes an output value.

The CMAC is a utilization of a nature that higher order vectors can generally be expressed as a mapping to a lower order space. In other words, the higher order vectors can be expressed using a plurality of lower order vectors and a function required for the lower order vectors may be at their low levels.

Generally, a function may be considered to be a mapping from a set of a state defined by an independent variable into a set of a state defined by a dependent variable.

$$f: C \rightarrow E$$

This expression reads as "f is a relation mapping a set C to a set E".

As appreciated from a mapping relationship, one of the states in the set E can be derived according to the relationship f for any one state of the set C. In addition, a plurality of points in the set C can be mapped to one of the points in the set E.

Now suppose that an operator is h as a function mapping an input S $(=s_1, s_2, s_3, \ldots, s_N)$ into an output p. h can be expressed as follows:

$$p = h(S) \text{ or } p = h(s_1, s_2, s_3, \ldots, s_N)$$

This expression can be diagrammed as shown in Table 1. In addition, suppose that the output is a vector P. The operator can be expressed as a set of operators h and in the following Table 2.

TABLE 1

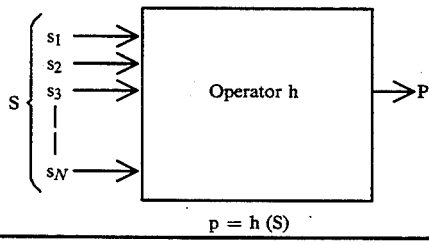

$p = h(S)$

TABLE 2

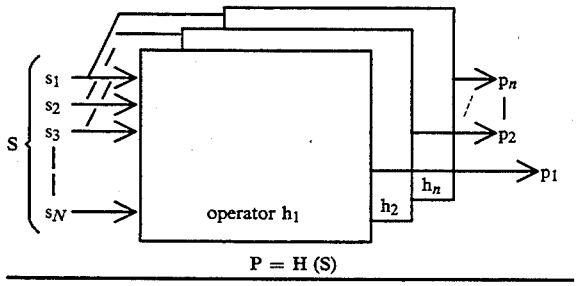

$P = H(S)$

As described above, the operator can described an operation of a single neuron or operations of neuron group in order to map the input into the output through some function. For example, in a case where the single neuron operation is described, suppose that an input to the neuron is a vector and its output is scaler.

$$P = h(S)$$

In addition, in the case of the neuron group, supposed that the input is a vector and output is also vector. The operations of the neuron group can be described as follows:

$$p = H(s).$$

Next, suppose that the input vector S is divided into two vector groups C and F. At this time, the feedback information to an instruction can be handled as inputsw and the CMAC can be operated as a non-linear feedback controller.

The above-described concept of the CMAC is followed by the functions of CMAC.

① Mapping S→M

In the CMAC, the set M to encode the input vector S described in the above expression (1) can be formulated in the following equation (1):

$$S \rightarrow M = \begin{bmatrix} s_1 \rightarrow m_1^* \\ s_2 \rightarrow m_2^* \\ s_3 \rightarrow m_3^* \\ \cdot \\ \cdot \\ \cdot \\ s_N \rightarrow m_N^* \end{bmatrix}$$

This shows that if, for all elements $S_1$ of the input vector S, a merely one set $m_1^*$ is present for all values in a region of $S_1$, the mapping relationship is present such as $S_1 \rightarrow m_1^*$.

In the CMAC, the individual mapping relationship is defined as K number of quantitization functions spaced apart from each other by 1/K of quantitization interval.

$$^1C_1, {}^1C_2, \ldots, {}^1C_k.$$

Suppose now that the input vector S is $S_1$, $S_2$, and the quantitization interval is 4. At this time, the quantitization function is $^1C_1$, $^1C_2$, $^1C_3$, $^1C_4$, $^2C_1$, $^2C_2$, $^2C_3$, $^2C_4$.

It is noted that each quantitization function can be expressed as follows:
$^1C_1 = (A, S, C, D, E)$
$^1C_2 = (F, G, H, I, J)$
$^1C_3 = (K, L, M, N, O)$
$^1C_4 = (P, Q, R, S, T)$
$^2C_1 = (a, b, c, d, e)$
$^2C_2 = (f, g, h, i, j)$
$^2C_3 = (k, l, m, n, o)$
$^2C_4 = (p, q, r, s, t)$ The mutually adjacent quantitization functions have a relation shifted by one quantitized unit and each quantitization function is present for a set constituted by values generated by the four quatitization functions. For example, $S_1 = 7$ is mapped into the set $m_1^* = (B, G, L, Q)$ and $S_2 = 10$ is mapped into the set $m_2^* = (q, c, h, m)$.

② Mapping M→A

The granular cells are identified depending on from which Hepatopsida (liverworts) fabrics the input is received. The reason is that the individual granular cells receives the several different Hepatopsida (liverworts) fabrics but neither one of the granular cells has no same combination of same inputs. This is because the mere description on the combination of Hepatopsida (liverworts) fabrics which is connected to the granular cells as the input permits the specification of one granular cell having the mapping relationship to the input.

An example of the combination of Hepatopsida (liverworts) fabrics constituting two quantitization functions can identify the granular cells of 5×5=25.

When input variables ($s_1 = 7$, $s_2 = 10$) are present from one Hepatopsida (liverworts) fabric expressed in terms of a two-dimensional vector, the selected granular cell is as follows:

$$m_1^* = (B, G, L, Q)$$

$$m_2^* = (g, c, h, m)$$

The input vector specifies the set of the granular cells, Bc, Gh, Lm, Qq. That is to say, a weight is selected only when the input vector S is placed in a region adjacent to a certain point within an input space.

③ Mapping A→P

The mapping of A→P is executed by taking a sum of weights selected by the input vector S and this is the scalar output value P.

Suppose that the set of the selected granular cells Bc, Gh, Lm, and Qq has the weight shown in the Table 3. At this time, the input vector S=(7, 10) is mapped into the set of the selected granular cells A*= (Bc, Gh, Lm, Qq) and only the following weight is selected and this is the output value.
WBc=1.0
WGh=2.0
WLm=0.0
WQq=1.0
P=WBc+WGh+WLm+WQq=4.0.

TABLE 3

(Learning method of CMAC)

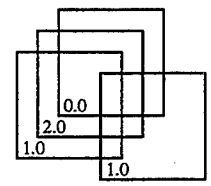

The CMAC provides a mapping relationship of the output value P to the input vector S. The CMAC is learned by appropriating the weights in the set of the granular cells. The following will describe its procedure.

(1) Determine a function to be learned (may be an input/output relationship of a controlled object) by means of the CMAC. That is to say, determine a vector value P to be finally derived with respect to the individual vectors S in the input space.

(2) Calculate P=H (S) with the CMAC driven, by providing one point data in the input vector space S, the output having the vector space P.

(3) If all elements of $P=(p_1, p_2, p_3, \ldots, p_N)$ and $\hat{P}=(\hat{p}_1, \hat{p}_2, \hat{p}_3, \ldots, \hat{p}_N)$, $|\hat{p}_i-p_i| \leq \xi_1$, the CMAC can determine that the learning is ended.

If $|p_1-p_1|>\xi_1$, $\delta_1$ is added to all weights $W_{ij}$ used when $p_1$ is derived.

It is noted that $\xi_1$ denotes a tolerance error and $\delta_1$ is calculated as follows:

$\delta_1=g (\hat{p}_1-p_1)/N$, wherein g denotes a gain coefficient corrected for each learning and N denotes the number of weights used when $p_1$ is derived.

Hereinafter, the second preferred embodiment using the CAMC will be described in details with reference to FIG. 10 through FIG. 13.

Figure 10:
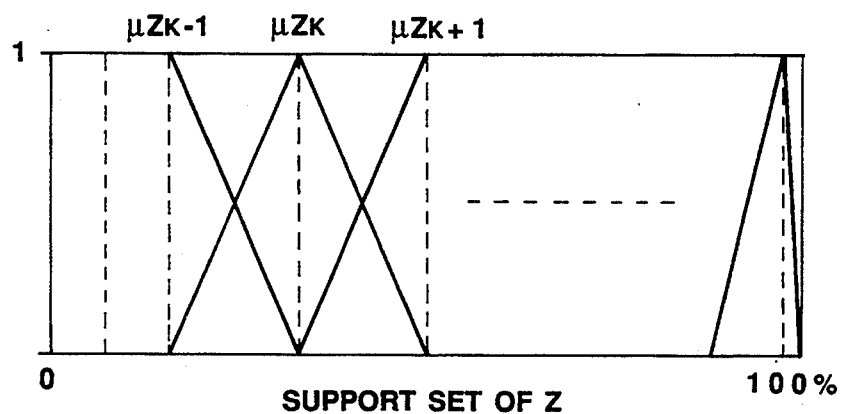
FIG. 10 is an explanatory view of an output membership function to be generated in the second preferred embodiment shown in FIGS. 9 (A) through 11.
Figure 11:
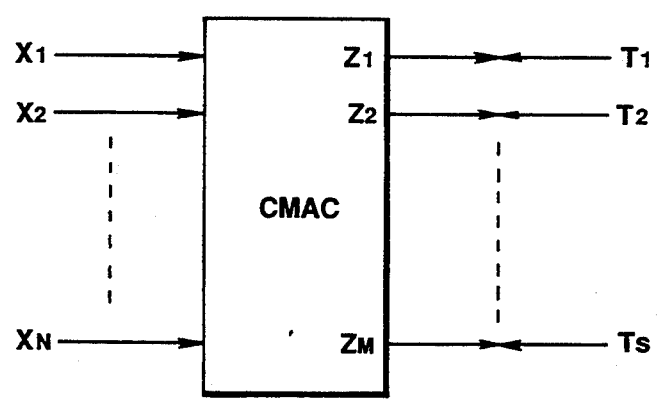
FIG. 11 is an explanatory view for explaining a schematic structure of CMAC in a multi-input, multi-output system.

Suppose that input variables of the CMAC exemplified by FIG. 11 are (X, Y) and output variable is (Z). In addition, suppose that an input space of the system is divided into five ranks according to the respective variables (refer to FIG. 10).

That is to say, a support set of each variable is divided into five ranks.

Each divided support set is attached with a fuzzy label as appreciated from FIGS. 9 (A) and 9 (B).

Figures 12, 13:
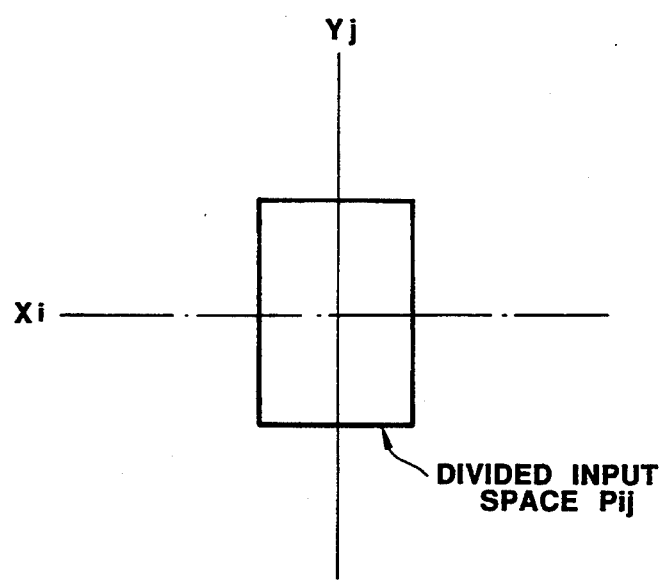
FIG. 12 is an explanatory view for explaining a relationship between a divided input space and learning data stored in the Cerebellar Model Arithmetic Computer shown in FIG. 9 (C).
FIG. 13 is an explanatory view for explaining an output data to be generated in a divided arbitrary input space in the preferred embodiment shown in FIG. 9 (A) and 9 (B) using the learning data.

Next, supposing that mark "" in the input spaces shown in FIG. 12 denotes a learning data for the CMAC, these data are learned so that the CMAC outputs a result of interpolation for the adjacent input data.

FIG. 13 shows a divided arbitrary input space.

In FIG. 13, Xi denotes an arbitrary and representative fuzzy label of the input variable X and $Y_i$ denotes an arbitrary and representative fuzzy label of the input variable Y.

An apex of the membership function representing a fuzzy label ($Z_k$) of the output variable in the linguistic fuzzy inference rule such as IF X is $X_i$ AND $Y_i$ is $Y_j$ THEN Z is $Z_k$) is provided as an output value of CMAC when (X=$X_i$, Y=Yi) is input thereto.

When such an operation as described above is repeated by the number of divided input spaces (in FIG. 12, number of divided input spaces are $5 \times 5 = 25$) so that values (vZk: k=1~n) on the support sets of the apexes of the membership functions corresponding to the fuzzy labels (Zk) of the output variable.

If the membership function of the output variable is a singleton, the value of vZk can directly be used. If the membership function of the output variable is a fuzzy, vZk is rearranged in the increase order to provide uZk (k=1~25) so that the membership function as shown in FIG. 10 is prepared and is applied to the fuzzy inference system.

Next, suppose that the CMAC is a multi-input, multi-output system model as shown in FIG. 11.

Suppose, furthermore, that the input variable is Xi (i=1~N), an output variable is Zj (j=1~M), and learning data to be provided for the system shown in FIG. 6 is denoted by Tk (k=1~S).

Next, suppose that the fuzzy label of the input variable is denoted by Li$\alpha$ ($\alpha=1$~P, provided that i denotes a number of the variable) and the fuzzy label of the output membership function is denoted by Li$\beta$ ($\beta=1$~Q). The fuzzy inference rule is expressed as: IF $X_i$ is Li$\alpha$ THEN $Z_j$ is Li$\beta$.

Values of the apexes of the fuzzy label (Li$\beta$) membership function are denoted by vLi$\beta$ and the values of Li$\beta$ are rearranged in the increase order as uLi$\beta$. Consequently, the membership function can be prepared.

As described hereinabove, since in the fuzzy rule and membership function automatically generating apparatus and method according to the present invention, the various effects can be achieved.

For example, when building up the fuzzy control system, it is not necessary to consider the control rules and membership functions.

All measurable data can be used in the fuzzy rules.

A minimum quantity of required rules can serve to construct the control system and the number of rules can be reduced. The fuzzy evaluation functions can be described in the fuzzy model so as to facilitate the system architecture.

The appropriate membership functions can be prepared.

The automatic fuzzy clustering function permits no difference between the well skilled operators.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. An apparatus for automatically generating fuzzy rules and membership functions to be supplied to a fuzzy inference system, comprising:

(a) a process data collecting block means for collecting first data including operation data carried out by a well skilled operator from a process which is a controlled object of the fuzzy inference system and for storing the first data into a process data temporary area;

(b) a data processing block means for calculating a second data which is not directly measured from the process, the calculating performed on the basis of the first data stored in the temporary area of the process data collecting block and for storing the calculated second data into a processed data temporary area;

(c) a process data base generating block means for generating a process data base from both the first and second data stored in the respective temporary areas of the process data collecting block and the data processing block;

(d) a fuzzy clustered data base generating block means for receiving third data generated in the process data base generating block and a fuzzy evaluation function and for detecting a status space satisfying the fuzzy evaluation function from the process data base so as to generate a fuzzy clustered data base;

(e) a fuzzy rule generator means for adding a fuzzy label to data, including input and output variables, stored in the fuzzy clustered data base and for generating fuzzy inference rules in the format of IF~THEN~, and for storing the generated fuzzy inference rules into a fuzzy inference rule file; and (f) a membership function generator means for generating membership functions corresponding to the fuzzy labels of the respective variables, using the data base generated by the fuzzy clustered data base generating block, and for storing the generated membership functions into a membership function file, wherein said process data generating means stores the process data in form of a matrix including dynamic characteristics matrix of the process in an N-order dimensional space of x1~Xn, wherein X1, ---, Xi, ---, Xn denotes process variables.

2. An apparatus for automatically generating fuzzy rules and membership functions to be supplied to a fuzzy inference system as set forth in claim 1, wherein the fuzzy evaluation function is expressed to represent an optimum state of the process as follows:

$$F(s) = f1(s) \lor f2(s) \lor \cdots \lor fi(s) \cdots \lor fn(s): fi(s) = \alpha i \cdot [1 \land [Xk \, (Dks)]](k=a \sim b):$$

wherein F(s) denotes a general fuzzy evaluation function,
fi(s) denotes a fuzzy evaluation function in a space i,
$\alpha$ i denotes a contributivity of fi(s) to F(s),
Xk denotes a process variable for the fuzzy evaluation in the space i,
Dks denotes a fuzzy evaluation value in Dk,
V denotes an OR operator, and $\Lambda$ denotes an AND operator.

3. An apparatus for automatically generating fuzzy rules and membership functions to be supplied to a fuzzy inference system as set forth in claim 2, wherein said fuzzy rule generator means generates each of the fuzzy rules as follows:

R:  IF *XP*1 is *LDP*1
    and *XP*2 is *LDP*2
    .
    .
    .
    and *XPj* is *LDPj*
    .
    .
    .
    and *XPn* is *LDPn*
    THEN *XS*1 is *LDS*1
    and *XS*2 is *LDS*2
    .
    . .
    .
    and *XSj* is *LDSj*
    .
    .
    .
    and *XSn* is *LDSn* wherein XP=XP1, XP2, ---, XPj, ---, XPn and denotes the input variable and process data;
XS=XS1, XS2, --, XSj, ---, XSn and denotes the output variable and operation data of the process, XP and XS are derived as follows:

XP=Dp1, Dp2, ---, Dpj, ---, Dpn;

XS=Ds1, Ds2, ---, Dsj, ---, Dsn;

wherein Dp1, Dp2, Dpj, Dpn denote data sets of the respective input variables (XP) stored in the fuzzy clustered data base generating block and Ds1, Ds2, Dsj, Dsn denote data sets of the respective output variables (XS) stored in the fuzzy clustered data base generating block,
and wherein LDP and LDS are fuzzy labels for the values (DP, DS) with respect to (XP, XS) and expressed as follows:

LDP=LDP1, LDP2, ---, LDPj, ---, LDPn;

LDS=LDS1, LDS2, , LDSj, ---, LDSn.

4. An apparatus for automatically generating fuzzy rules and membership functions to be supplied to a fuzzy inference system as set forth in claim 3, wherein said membership function generator means generates each of membership functions in the form of a triangle.

5. An apparatus for automatically generating fuzzy rules and membership functions to be supplied to a fuzzy inference system as set forth in claim 4, wherein said membership function generator means includes: a) an input system, constituted by a computer system, having a learning memory means for storing learning data for all of input spaces, the input spaces being clustered for each fuzzy inference input variable; b) an output system means, constituted by the computer system, for determining a fuzzy label for each input variable, for dividing support sets of the respective input variables according to the determined fuzzy labels, for determining and storing a weight table of the computer system according to the number of divided support sets, for learning the computer system using the learning data on the basis of the fuzzy labels of the respective input variables, the weight table, and the number of divided support sets so that each representative point of the fuzzy labels of the input variables is input to the learned computer system to automatically derive at least one output value corresponding to the representative points for the input variables, and for providing the fuzzy labels for the output variable to fuzzify the output value to form the membership function of the output system.

6. A method for automatically generating a membership function for a fuzzy inference system comprising the steps of:
a) storing learning data including fuzzy inference input variables in input spaces, the input spaces being clustered for each fuzzy inference input variable;
b) determining a fuzzy label for each input variable;
c) dividing the input variables into support sets according to the determined fuzzy labels;
d) determining and storing a weight table in a computer system according to the number of divided support sets;
e) training the fuzzy inference system using the learning data on a basis of the fuzzy labels of the respective input variables, the weight table, and the number of divided support sets so that each representative point of the fuzzy labels of the input Variables is input to the learned fuzzy inference system to automatically derive at least one output value corresponding to the representative points for the input variables; and
f) providing the fuzzy labels for the output variable to fuzzify the output value to form the membership function of the output system,
including the step of providing the learning data stored in said step a) from a data base including data which satisfies a fuzzy evaluation function for a substantially optimum system.

* * * * *